UNITED STATES PATENT OFFICE.

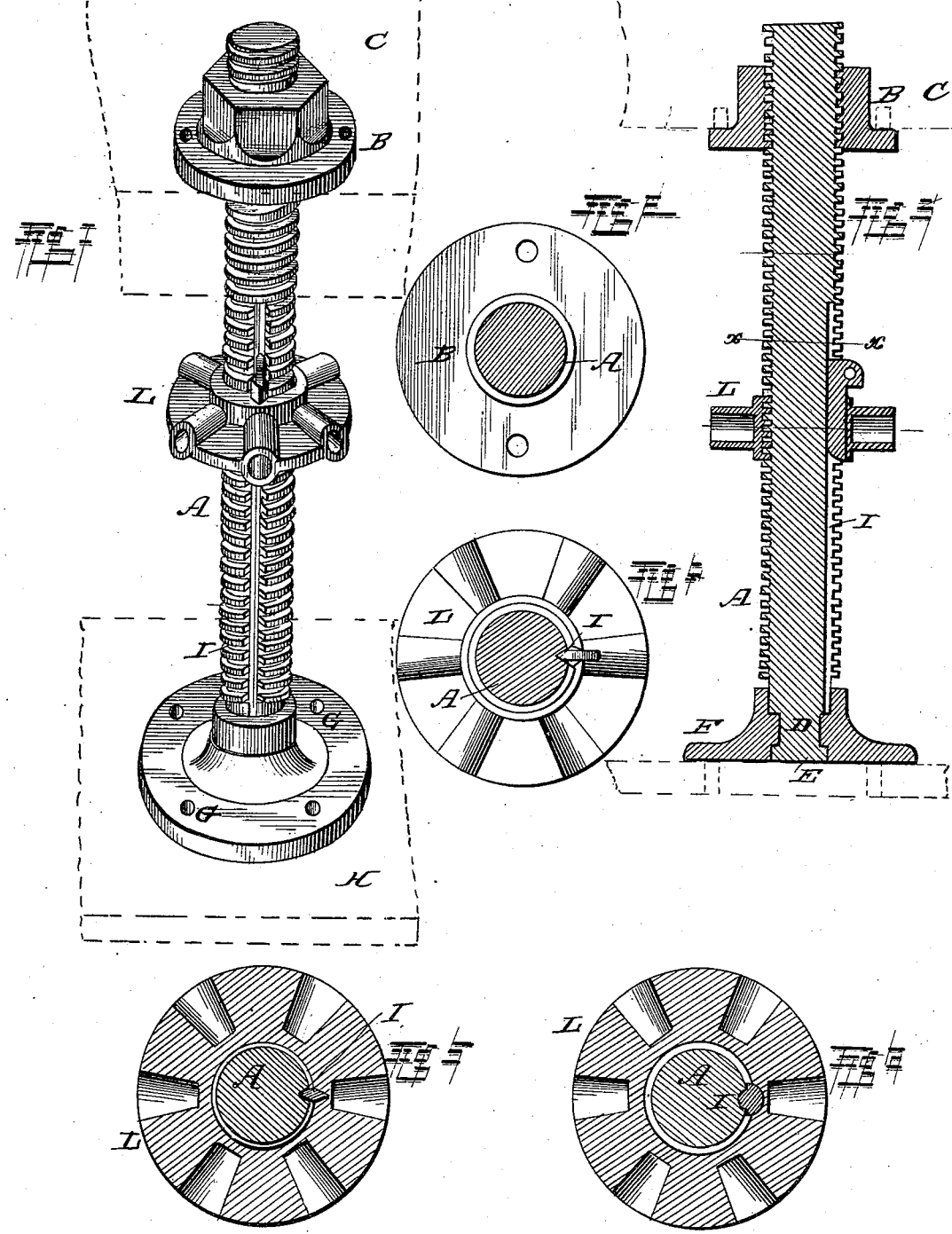

JOHN PERCIAL PARKER, OF RIPLEY, OHIO.

FOLLOWER-SCREW FOR TOBACCO-PRESSES.

SPECIFICATION forming part of Letters Patent No. 304,552, dated September 2, 1884.

Application filed June 3, 1884. (No model.)

*To all whom it may concern:*

Be it known that I, JOHN P. PARKER, a citizen of the United States, and a resident of Ripley, in the county of Brown and State of Ohio, have invented certain new and useful Improvements in Follower-Screws for Tobacco-Presses; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved follower-screw for tobacco and other presses. Fig. 2 is a cross-section of the same. Fig. 3 is a vertical sectional view. Fig. 4 is a horizontal sectional view taken on the line $x\ x$ in Fig. 3. Fig. 5 is a horizontal sectional view taken through the screw and lever-nut, and Fig. 6 is a horizontal sectional view taken through a screw and lever-nut of a slightly-modified construction.

The same letters refer to the same parts in all the figures.

This invention relates to follower-screws adapted especially for tobacco-presses, but capable of being applied to packing-presses of all descriptions; and it consists in the improved construction and combination of parts which will be hereinafter fully described, and particularly pointed out in the claims.

In the drawings hereto annexed, A designates the screw, the upper end of which works in a nut, B, which is permanently attached or fitted in a cross head or beam, C, which is shown in dotted lines in the drawings hereto annexed. The lower end of the screw is provided with a reduced point, D, having a collar, E, by means of which it is connected with a boss, F, having suitable bearings for the said reduced end of the screw, and provided with perforations G, by means of which it may be attached, by screws, bolts, or other fastening devices, to a suitable follower-plate. (Shown in dotted lines in the drawings and indicated by the letter H.) The screw is provided for the greater part of its length with a longitudinal groove, I, extending from the lower end in an upward direction, and cut not only through the threads of the screw, but into the body of the same to a considerable depth. This groove may be V-shaped in cross-section, as shown in Figs. 1 to 5 of the drawings, or it may be U-shaped, as shown in Fig. 6, the only proviso being that it shall extend to a depth considerably below the threads of the screw, my object being to relieve the threads from any strain that would otherwise be exerted upon them by the operation of the device.

L designates a lever-nut, which is fitted upon the screw, and provided in one side with a groove corresponding in shape with the groove upon the screw, and adapted to receive, when registering with the same, a properly-shaped key, pin, or other locking device, which may be adjusted detachably in the said grooves when brought together. The lever-nut L is provided in its marginal periphery with a series of openings or recesses adapted to receive a bar or lever, by means of which the device may be operated.

In operation the follower-screw is operated by means of the lever inserted into one of the recesses in the nut L. When the follower has been lowered to such an extent that the package containing the material to be compressed interferes with the operation of the lever, it is only necessary to release the key connecting the lever-nut with the screw and raise the said lever-nut by turning it upon the screw until it reaches the desired elevation. The lever-nut is then again attached to the screw by means of the key or pin, and the operation proceeded with as before. By this construction I avoid the interposition of supplemental blocks between the follower and the follower-plate, and the consequent delay in work. In raising the follower-plate after the completion of the pressing, the collar at the lower end of the screw will lift the follower-plate and take all the strain of the weight of the latter, while during the downward pressure the shoulder necessarily formed upon the lower end of the follower-screw will bear against the box, thus forcing the latter in a downward direction.

It will be seen that by this construction all possibility of strain upon the threads of the follower-screw is avoided, the key, whether oval or diamond shaped, extending into the body of the screw toward the axis of the latter, so that in operation the pressure of the key, caused by the action of the lever, shall be upon the solid metal, thus preventing the screw-threads from being chipped or otherwise injured.

Having thus described my invention, I claim and desire to secure by Letters Patent of the United States—

1. The combination of a screw having a longitudinal groove cut across the threads into the solid part or barrel of the screw, a lever-nut having a notch corresponding in cross-section with the shape of the said groove, and a key adapted to fit into the said notch and groove, and having one of its sides projecting into the cut-away portion of the screw-barrel, substantially as set forth.

2. The herein-described improved follower-screw for tobacco and other presses, the same comprising a screw having a longitudinal groove cut through its threads and into the body or barrel, a lever-nut having a notch corresponding in shape with and adapted to register with the groove and the screw, a connecting pin or key, a fixed nut forming a bearing for the screw, and a boss mounted upon the lower reduced end of the screw, and connected thereto by means of a collar integral with the lower extremity of the said reduced end, the said boss being attached to the follower-plate of the press, substantially as herein described, for the purpose shown and specified.

In testimony that I claim the foregoing as my own I have hereunto affixed my signature in presence of two witnesses.

JOHN PERCIAL PARKER.

Witnesses:
H. G. MADDOX,
T. W. KIRKPATRICK.